United States Patent
Khalil et al.

(10) Patent No.: US 6,574,214 B1
(45) Date of Patent: Jun. 3, 2003

(54) REDUCED OVERHEAD TUNNELING TECHNIQUES IN A COMMUNICATIONS NETWORK HAVING MOBILE FOREIGN AGENTS

(75) Inventors: Mohamed Khalil, Dallas, TX (US); Emad A. Qaddoura, Plano, TX (US); Haseeb Akhtar, Garland, TX (US); Russell C. Coffin, Plano, TX (US); Liem Q. Le, Richardson, TX (US); Krish Pillai, Dallas, TX (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/579,069

(22) Filed: May 25, 2000

(51) Int. Cl.[7] .......................... H04L 12/28; H04L 15/56; G06F 15/173; H04Q 7/20
(52) U.S. Cl. ....................... 370/349; 370/389; 370/392; 709/238; 455/445
(58) Field of Search ................................ 455/433, 445; 370/349, 389, 392, 393, 236, 285, 390, 401, 402, 403; 709/238–239, 230, 200

(56) References Cited

U.S. PATENT DOCUMENTS

| | | | |
|---|---|---|---|
| 5,740,374 A | * | 4/1998 | Raffali-Schreinemachers ... 709/238 |
| 5,793,762 A | | 8/1998 | Penners et al. |
| 5,883,890 A | | 3/1999 | Okanoue et al. |
| 5,905,719 A | | 5/1999 | Arnold et al. |
| 6,256,300 B1 | * | 7/2001 | Ahmed et al. ............... 370/331 |

OTHER PUBLICATIONS

La Porta, Thomas F.; Salgarelli, Luca; Foster, Gerald T.; "Mobile IP and Wide Area Wireless Data"; 1998, IEEE.
Perkins, Charles E..; "Tutorial: Mobile Networking Through Mobile IP"; Jan. 1998; IEEE Internet Computing.
Perkins, C.; "RFC 2002: IP Mobility Support;" Oct. 1996, Network Working Group.
Perkins, C.; "RFC 2003: IP Encapsulation Within IP;" Oct. 1996, Network Working Group.
Perkins, C.; "RFC 2004: Minimal Encapsulation Within IP;" Oct. 1996, Network Working Group.
Simpson, W.; "RFC 1853: Ip in IP Tunneling;" Oct. 1995, Network Working Group.
Mobile IP Discussions Regarding Concept of Mobile Routers in Mobile IP Working Group, as describe in "Declaration of Mohamed Khalil", Nov. 2002.
RFC 2002bis Draft Revision of "RFC 2002 IP Mobility Support for IPv4", as described in "Declaration of Mohamed Khalil", Nov. 2002.
GM Trial of Concept for Mobile Routers in Vehicles, as described in "Declaration of Mohamed Khalil", Nov. 2002.

* cited by examiner

Primary Examiner—Nay Maung
Assistant Examiner—Raymond Persino
(74) Attorney, Agent, or Firm—Storm & Hemingway (57) ABSTRACT

In a mobile communication system having mobile foreign agents, the present invention eliminates the use of multiple source/destination headers attached to an information packet during the tunneling operation by using either a decapsulation/encapsulation or a forwarding operation with the encapsulated information packet. Either of these operations reduces the overhead incurred in the multiple encapsulation headers by reducing encapsulation of the information packet to a single level.

Upon receipt of the information packet at the foreign agent on the communications system, the information packet is directed to the mobile node using a routing chain table maintained by the foreign agent or a next hop routing table maintained by the foreign agent and each mobile foreign agent in the transmission path. Once implemented, these data structures can also assist with routing of information packets within the foreign subnetwork.

40 Claims, 3 Drawing Sheets

REDUCED OVERHEAD TUNNELING TECHNIQUES IN A COMMUNICATIONS NETWORK HAVING MOBILE FOREIGN AGENTS

TECHNICAL FIELD OF THE INVENTION

This invention relates to an improved Internet Protocol (IP) based mobile communications system having static agents (such as a Home Agent and a Foreign Agent) and mobility agents (such as Mobile Foreign Agents and Mobile Nodes), as well as an improved method for operating said system.

BACKGROUND OF THE INVENTION

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

Defense Department officials requested that a system be built to permit communication between these different computer networks. The Defense Department recognized, however, that a single centralized system would be vulnerable to missile attacks or sabotage. Accordingly, the Defense Department mandated that the system to be used for communication between these military computer networks be decentralized and that no critical services be concentrated in a few, vulnerable failure points. In order to achieve these goals, the Defense Department established a decentralized standard protocol for communication between network computers.

A few years later, the National Science Foundation (NSF) wanted to connect network computers at various research institutions across the country. The NSF adopted the Defense Department's protocol for communication, and this combination of research computer networks would eventually evolve into the Internet.

Internet Protocols

The Defense Department's communication protocol governing data transmission between computers on different networks was called the Internet Protocol (IP) standard. The IP standard now supports communications between computers and networks on the Internet. The IP standard identifies the types of services to be provided to users, and specifies the mechanisms needed to support these services. The IP standard also describes the upper and lower system interfaces, defines the services to be provided on these interfaces, and outlines the execution environment for services needed in the system.

A transmission protocol, called the Transmission Control Protocol (TCP), was also developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

The TCP/IP Protocol

In a typical Internet-based communication scenario, data is transmitted from an applications program in a first computer, through the first computer's network hardware, and across the transmission medium to the intended destination on the Internet. After receipt at a destination computer network, the data is transmitted through the destination network to a second computer. The second computer then interprets the communication using the identical protocols on a similar application program. Because of the standard protocols used in Internet communications, the TCP/IP protocol on the second computer should decode the transmitted information into the original data transmitted by the first computer.

The TCP/IP Protocol Layers

One of the rules in TCP/IP communications is that a computer user does not need to get involved with details of data communication. In order to accomplish this goal, the TCP/IP standard imposes a layered communications system structure. All the layers are located on each computer in the network, and each module or layer is a separate component that theoretically functions independent of the other layers.

TCP/IP and its related protocols form a standardized system for defining how data should be processed, transmitted and received on the Internet. TCP/IP defines the network communication process, and more importantly, defines how a unit of data should look and what information the message should contain so that the receiving computer can interpret the message correctly. Because the standardized layer design of TCP/IP, a consistent conversion of base data is ensured regardless of the version or vendor of the TCP/IP conversion software.

When a first computer transmits a data message to a second computer on the Internet—either sending a message or requesting information—the TCP/IP Protocol Layers in the first computer prepare the base data for transmission to a second computer by adding additional information to the base data. New pieces of information are added to the base data as the base data descends through each layer in the protocol. After processing, the base data with various headers will form a fully structured information packet under the TCP/IP protocol. The information packet will include header information that identifies the source of the information packet and its intended destination.

After the base data has been processed by all the layers in the protocol, it is ready for transmission across the Internet to the destination computer. After receipt of the information packet, the second computer operates on the information packet using the same set of TCP/IP protocol layers—only in reverse order. As the transmitted information packet ascends through the protocol layers in the second computer, each protocol level strips away the information added by the first computer to ultimately leave the base data in the applications program of the second computer.

TCP/IP Addressing and Routing

A computer operating on a network is assigned a unique physical address. On a Local Area Network ("LAN"), the physical address of the computer is a number given to computer's network adapter card. Hardware LAN protocols use this physical address to deliver packets of data to computers on the LAN.

On the Internet, the TCP/IP protocol routes data packets using logical addressing. The network software in the Network Layer generates logical addresses. Specifically, a logical address in the TCP/IP network is translated into a corresponding physical address using the ARP (Address Resolution Protocol) and RARP (Reverse Address Resolution Protocol) protocols in the Network Layer.

The TCP/IP's logical address is also called an IP address. The IP address can include: (1) a network ID number identifying a network, (2) a sub-network ID number identifying a sub-network on the network, and, (3) a host ID number identifying a particular computer on the sub-network. The header data in the information packet will include source and destination addresses. The IP addressing scheme imposes a sensible addressing scheme that reflects the internal organization of the network or sub-network.

A computer network is often subdivided into smaller sub-networks. The computer network is divided in this manner to increase data transmission efficiency and reduce overall network traffic. Routers are used to regulate the flow of data into and out of designated sub-networks of the computer network.

A router interprets the logical address information of a data packet, such as an IP address, and directs the data packet across the network to its intended destination. Data addressed between computers on the sub-network does not pass through the router to the greater network, and therefore does not clutter the transmission lines of the greater network. If data is addressed to a computer outside the sub-network, however, the router forwards the data onto the larger network.

The TCP/IP network includes protocols that define how routers will determine the path for data through the network. Routing decisions are based upon information in the IP packet header and entries in each router's routing table. A routing table possesses sufficient information for a router to make a determination on whether to accept the communicated information on behalf of a destination computer, or pass the information onto another router in the network. The routing table also permits the router to determine where the information should be forwarded within the network or sub-network.

The routing table can be configured manually with routing table entries or a dynamic routing protocol that can accommodate changing network topologies—network architecture or network layouts, routers, and interconnections between hosts and routers. In a dynamic routing protocol, a router advertises reachability when it sends updated routing information to a second router claiming that the first router is capable of reaching one or more destination addresses. Advertising accessibility is important to the process of receiving, directing and re-directing data packets on the Internet.

SUMMARY OF THE INVENTION

Internet protocols were originally developed with an assumption that Internet users, which are assigned a unique IP address, would be connected to a single, fixed network—that is, one physical fixed location. With the advent of portable and handheld computers, however, the movement of Internet users within a network and across network boundaries has become quite common. Because of this highly mobile Internet usage, the implicit design assumptions for the Internet protocols have been violated.

The present invention relates to an improved IP-based mobile system defined by an apparatus and method for managing bi-directional transmission of information with at least one Mobile Node in a wireless communication system. The term "Mobile Node" includes a mobile communication unit, and, in addition to the Mobile Node, the communication system has a home network, a foreign network, and at least one mobile foreign network. The Mobile Node may change its point of attachment to the Internet through these other networks, but the Mobile Node will always be associated with a single Mobile Node home network for IP addressing purposes. For the purposes of this application, a network includes a separate computer network or sub-network on a wireless communication system.

The Mobile Node home network has a Home Agent and the foreign network has a Foreign Agent—both of which control the routing of packeted information into and out of their network. The mobile foreign network also has a Mobile Foreign Agent to assist with routing of packeted information into and out of the mobile network. Like the Mobile Node, the Mobile Foreign Agent may change its point of attachment to the Internet through other networks, but the Mobile Foreign Agent will always be associated with a single Mobile Foreign Agent home network for IP addressing purposes.

The terms Home Agent, Foreign Agent, and Mobile Foreign Agent may be defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network having the responsibility to manage mobility-related functionality for a Mobile Node on a home network. Likewise, the term Foreign Agent, as used in this application, can refer to a Serving Mobility Manager, Visited Location Register, Visiting Serving Entity, or any other agent on a foreign network having the responsibility to manage mobility-related functionality for a Mobile Node on a foreign network.

Care-Of Addressing For Mobile Nodes

An IP-based mobile system controls mobile communication by managing the "care-of" address assignments. A Mobile Node Home Agent comprises a router with an interface on the Mobile Node's home network. When the Mobile Node is located on the home network, packeted information may be directed to the Mobile Node by the Mobile Node Home Agent through a direct communication link.

When the Mobile Node moves to a foreign network or mobile foreign network, the Mobile Node keeps the Mobile Node Home Agent informed of its current location by registering a care-of address with the Mobile Node Home Agent. This care-of address represents the current foreign network or mobile foreign network where the Mobile Node is located. For a Mobile Node, the care-of address is used to re-route all packeted information destined for a Mobile Node to the foreign network or mobile foreign networks associated with the Mobile Node.

Care-Of Addressing For Mobile Foreign Networks

Each Mobile Foreign Agent has a MFA Home Agent on an MFA home network. When the Mobile Foreign Agent is attached to the MFA home network, all packeted information directed to nodes attached to the Mobile Foreign Agent will be sent to the MFA home network for routing directly to the Mobile Foreign Agent.

Like the Mobile Node, however, each Mobile Foreign Agent can move from one network attachment to another.

When not located at the MFA home network, the Mobile Foreign Agent will have a care-of address identifying the foreign network or other mobile foreign network where the Mobile Foreign Agent is located. The Mobile Foreign Agent will register this care-of address with it MFA home network to keep the home network aware of its current location. The care-of address is used to re-route all packeted information destined for the Mobile Foreign Agent to the appropriate foreign network or other mobile foreign network associated with the addressed Mobile Foreign Agent.

When a Correspondent Node communicates to a Mobile Node associated with a Mobile Foreign Agent and the Mobile Foreign Agent is located outside the MFA home network, the information packet from the Correspondent Node will initially be sent to the Home Agent (due to the IP routing mechanism) of the Mobile Node. This Mobile Node Home Agent will re-route (or "tunnel") the information packet to the care-of address of the Mobile Foreign Agent. Through normal IP routing, the information packet will eventually end up at the MFA Home Agent. The MFA Home Agent then uses the care-of address to direct (or "tunnel") information packets to the Mobile Foreign Agent. The Mobile Foreign Agent then de-tunnels the packet and forwards it to the Mobile Node. While the present invention can operate under the Mobile IP protocol (RFC 2002), the invention is not limited to this protocol and can be used with any IP-based mobile system having mobility agents.

Tunneling and Encapsulation

If the Mobile Node is coupled to a foreign network, the Home Agent will "tunnel" communications to the Mobile Node. When "tunneling" a communication, the Home Agent receives an information packet addressed to the Mobile Node, and the Home Agent will tunnel, or transfer, these data packets to the Mobile Node's current location on its then associated foreign network or mobile foreign network. Under standard protocols, the Home Agent will encapsulate the data packet with at least source/destination information in an additional header to assist in the tunneling process.

If the Mobile Node is attached to a Mobile Foreign Agent, the tunneling operation will require that the information packet be sent from the Mobile Node's Home Agent to the home network of the Mobile Foreign Agent (MFA home network). The MFA Home Agent on the MFA home network then receives the information packet (since the IP address of the Mobile Foreign Agent is topologically the same as the IP addresses of the MFA home network).

After receipt of the information packet, the MFA Home Agent will encapsulate the packeted information with an additional source/destination header before forwarding the packeted information onto the appropriate foreign network or MFA foreign network. The encapsulation of the information packet with source/destination headers must occur for every Mobile Foreign Agent present between the Mobile Node and the foreign network.

The additional header information could become quite extended as more Mobile Foreign Agents are present between the foreign network and the Mobile Node. In fact, after the addition of only a few additional Mobile Foreign Agents, the header information could become greater than the base data size (payload) in the information packet.

It is therefore an objective of the present invention to reduce the size of headers attached to information packets during multiple header encapsulations. This objective will reduce the overall size of the headers transmitted in an information packet thereby reducing the amount of overhead control information. As a result, this invention will increase the net amount of data transmitted with the information packet. This objective is accomplished by two novel methods—called decapsulation/encapsulation and forwarding. While either novel technique may be used to accomplish the goals of this invention, each technique will eliminate the multiple levels of encapsulation by supporting the tunneling of information packets in the mobile network using a single level of encapsulation.

Under existing protocols (such as RFC 2002), the Foreign Agent in the foreign network will receive an encapsulated information packet for routing. The Foreign Agent processes the data packets by decapsulating the outer source/destination header in the information packet. The Foreign Agent will then transfer the information packet to the next Mobile Foreign Agent or the Mobile Node as identified in the decapsulated destination field of the information packet. Successive decapsulation operations will continue until all the multiple levels of encapsulation are exhausted and the destination field in the information packet identifies the final destination of the Mobile Node. The existing protocols depend on the existence of multiple levels of encapsulation to direct the information packet through the foreign network and the mobile foreign networks.

Because the present invention eliminates multiple levels of encapsulation, novel approaches are used to direct the information packets through the foreign network and mobile foreign networks. Accordingly, the present invention also includes two novel approaches for directing information packets through the foreign and mobile foreign networks with a single level of encapsulation, and these methods are called source routing and next hop routing. As with the encapsulation methods in the present invention, the information packet may be directed through the foreign network and Mobile Foreign Agents using either approach depending on the system requirements.

In this aspect of the invention, the Foreign Agent will use the information found in the internal data structures supported by the source routing or next hop routing schemes to efficiently route information packets to destinations within the foreign network or mobile foreign networks. The Foreign Agent will inspect the data structures used to support source routing and next hop routing much like a routing table to determine if a Mobile Node is already present on another part of the foreign network and mobile foreign networks attached to the Foreign Agent. If the Mobile Node is present, the information packet will be appropriately routed to the Mobile Node without transmitting the information packet outside the networks controlled by the foreign networks. Because the data structures supporting source routing and next hop routing are already available to the Foreign Agent, no modifications to the current system need to be effected apart from the small program alternations needed to search those data structures prior to transmission of information packets out of the network, and routing the information packet appropriately based on the results of that comparison.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 4 is a representation of the present invention encapsulation technique having a single level of encapsulation;

FIG. 5 is a representation of a Mobile Node routing chain data structure on a visiting list;

FIG. 6 is a representation of a linked list data structure for two Mobile Nodes; and, FIG. 7 is a representation of a flow chart representation of next hop routing tables located on the foreign network.

DETAILED DESCRIPTION OF THE PREFERRED EMBODIMENTS

Mobile IP protocols support the routing of data communications to Mobile Nodes on the Internet. In a mobile IP system, each Mobile Node is identified by a permanent IP address associated with a home network. While the Mobile Node is coupled to its home network, the Mobile Node functions as any other fixed node on that network. When the Mobile Node moves from its home network to a foreign network, however, the home network sends data communications to the Mobile Node by "tunneling" the communications to the foreign network and/or mobile foreign network where the mobile user is located.

Figure 1:
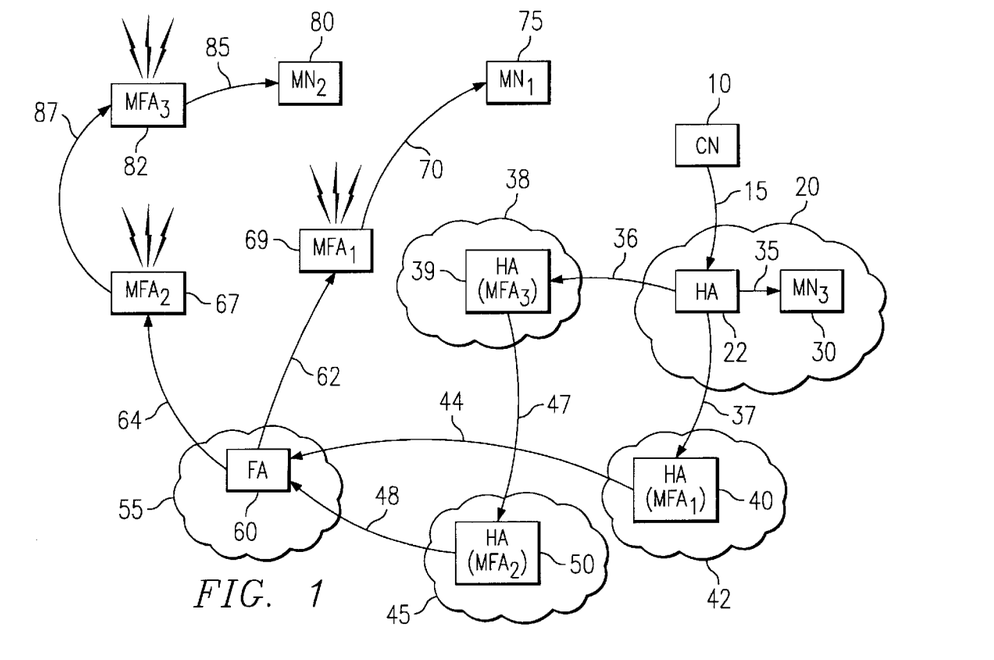
FIG. 1 is a schematic diagram of the mobile communication system having Mobile Nodes and mobile foreign agents.

Looking at FIG. 1, the Correspondent Node (CN) 10 sends an information packet to any Mobile Node (such as $MN_1$, $MN_2$ and $MN_3$) that are associated (or "owned") by the home network 20. The information packet is then received by the Home Agent 22 on communication link 15 as a result of the normal IP routing schemes. The Home Agent 22 accepts the information packet, and if the information packet is directed to a Mobile Node located on the home network 20 (such as Mobile Node ($MN_s$) 30), the Home Agent 22 will direct the information packet directly to the Mobile Node. In FIG. 1, the Home Agent 22 will direct the information packet directly to the Mobile Node ($MN_s$) 30 along communication link 35.

If the Mobile Node is attached to a network outside the home network 20, the Home Agent will direct the information packet to the Mobile Node using a "tunneling" technique. The Home Agent 22 will encapsulate the information packet using a care-of address registered by the Mobile Node with the Home Agent 22. The care-of address identifies the foreign network and/or mobile foreign network where the Mobile Node is located.

Mobile IP protocols require that the Mobile Node register the care-of address with the Home Agent on the home network after movement to a new network. All communications addressed to the Mobile Node are routed according to normal IP protocols to the Mobile Node's home network. After the Home Agent receives a communication for the Mobile Node, however, the Home Agent sends, or "tunnels", the message to the mobile user at the care-of address.

In FIG. 1, Mobile Node ($MN_1$) 75 would register a care-of address with Home Agent 22 identifying $MFA_1$ 69 as the mobile foreign network where it can be located. $MFA_1$ 69 would also register a care-of address with its Home Agent ($MFA_1$) 40 on the $MFA_1$ home network 42 identifying the Foreign Agent 60 as the foreign network where it can be located.

According to standard protocols, the information packet addressed to the Mobile Node ($MN_1$) 75 from the Correspondent Node (CN) 10 would be initially directed to the Home Agent 22 on home network 20. A representation of this information packet can be seen in FIG. 2 where information packet 100 includes the sender CN in the source field and the destination MN in the destination field of the IP header. The crosshatched areas represent the base data (payload) in information packet 100.

Figure 2:
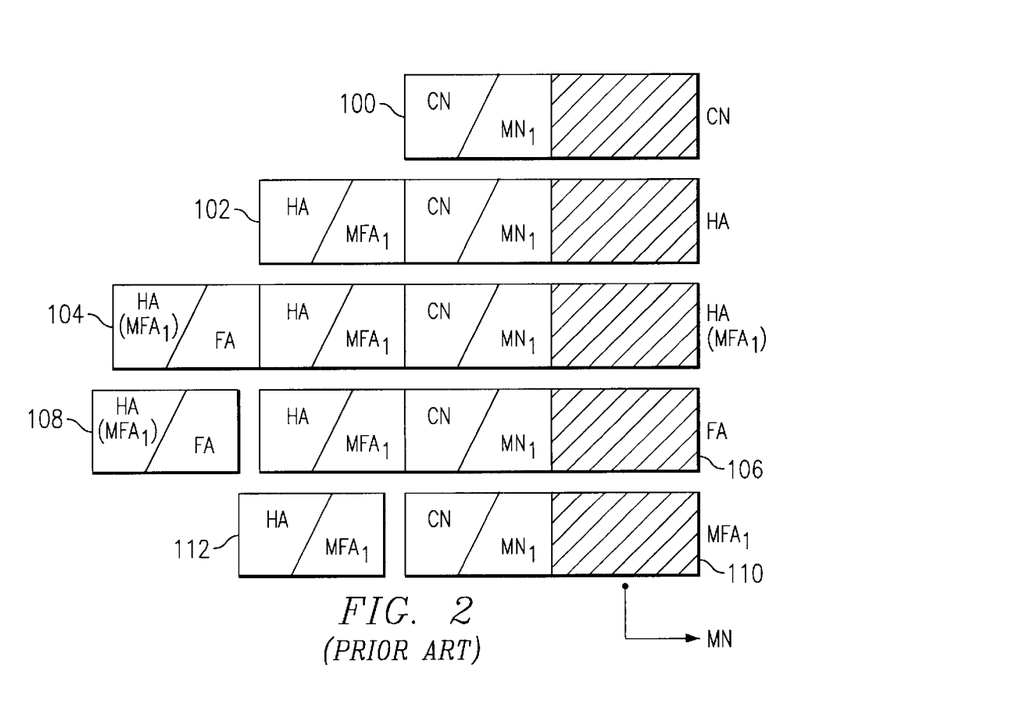
FIG. 2 is a representation of a prior art encapsulation technique for tunneling an information packet to a Mobile Node through a single mobile foreign agent.

In FIG. 1, the Home Agent 22 would encapsulate the information packet 100 by adding header information based on the care-of address for Mobile Node ($MN_1$) 75, which includes addresses for the fixed permanent IP address for $MFA_1$—that is, the Home Agent ($MFA_1$) 40 on $MFA_1$ home network 42. The encapsulated information packet is shown in FIG. 2 as information packet 102 with the destination address $MFA_1$ placed in the destination field of the IP header.

The information packet 102 is directed to Home Agent ($MFA_1$) 40 along communication link 37, whereupon the Home Agent ($MFA_1$) 40 will encapsulate the information packet again using the care-of address of $MFA_1$ 69. This care-of address would include a reference to the Foreign Agent 60 located on the foreign network 55. This encapsulated information packet is represented by information packet 104 where the address of HA($MFA_1$) is placed in the source field and the address of Foreign Agent 60 is placed in the destination field of the IP header, respectively. After encapsulation, the information packet would then be directed to the Foreign Agent 60 along communication link 42.

Upon receipt of the information packet 104, the Foreign Agent 60 will decapsulate the information packet 104 by removing the source/destination header having the Foreign Agent address. The decapsulation process can be seen in FIG. 2 where the decapsulated source/destination header 108 has been removed from the remainder of the information packet 106. The Foreign Agent 60 determines that the Mobile Foreign Agent 69 is the next routing point for the information packet 106 based on the address of the Mobile Foreign Agent ($MFA_1$) 69 that was placed earlier in the destination field of the IP header of the information packet 106. As shown in FIG. 1, the Foreign Agent 60 directs the information packet to the current location for Mobile Foreign Agent ($MFA_1$) 69 along communication link 62.

The Mobile Foreign Agent ($MFA_1$) 69 accepts the information packet 106 and decapsulates the source/destination header information with the $MFA_1$ address from the remainder of the information packet. The decapsulated source/destination header information 112 is shown in FIG. 2 with the remainder of the information packet 110. The Mobile Foreign Agent ($MFA_1$) 69 determines that Mobile Node ($MN_1$) is the proper destination for information packet 110 based on the MN address in the destination field of the IP header of the information packet 110. The Mobile Foreign Agent ($MFA_1$) 69 directs the information packet 110 to the Mobile Node ($MN_1$) 75 based along communication link 70. The information packet 110 is then processed by Mobile Node ($MN_1$) 75 to extract the base data therefrom.

In a second routing example shown on FIG. 1, Mobile Node ($MN_2$) 80 would register a care-of address with Home Agent 22 identifying $MFA_3$ 82 as the mobile foreign network where it can be located. $MFA_3$ 82 would also register a care-of address with its Home Agent ($MFA_3$) 39 on the $MFA_3$ home network 38 identifying $MFA_2$ 67 as the mobile foreign network where it can be located. $MFA_2$ 67 would also register a care-of address with its Home Agent ($MFA_2$) 50 on the $MFA_2$ home network 45 identifying the Foreign Agent 60 as the foreign network where it can be located.

According to standard protocols, the information packet addressed to the Mobile Node ($MN_2$) 80 from the Correspondent Node (CN) 10 would be initially directed to the Home Agent 22 on home network 20. A representation of this information packet can be seen in FIG. 3 where information packet 150 includes the sender CN in the source field and the destination MN in the destination field of the IP header. The crosshatched areas represent the base data (payload) in information packet 150.

Figure 3:
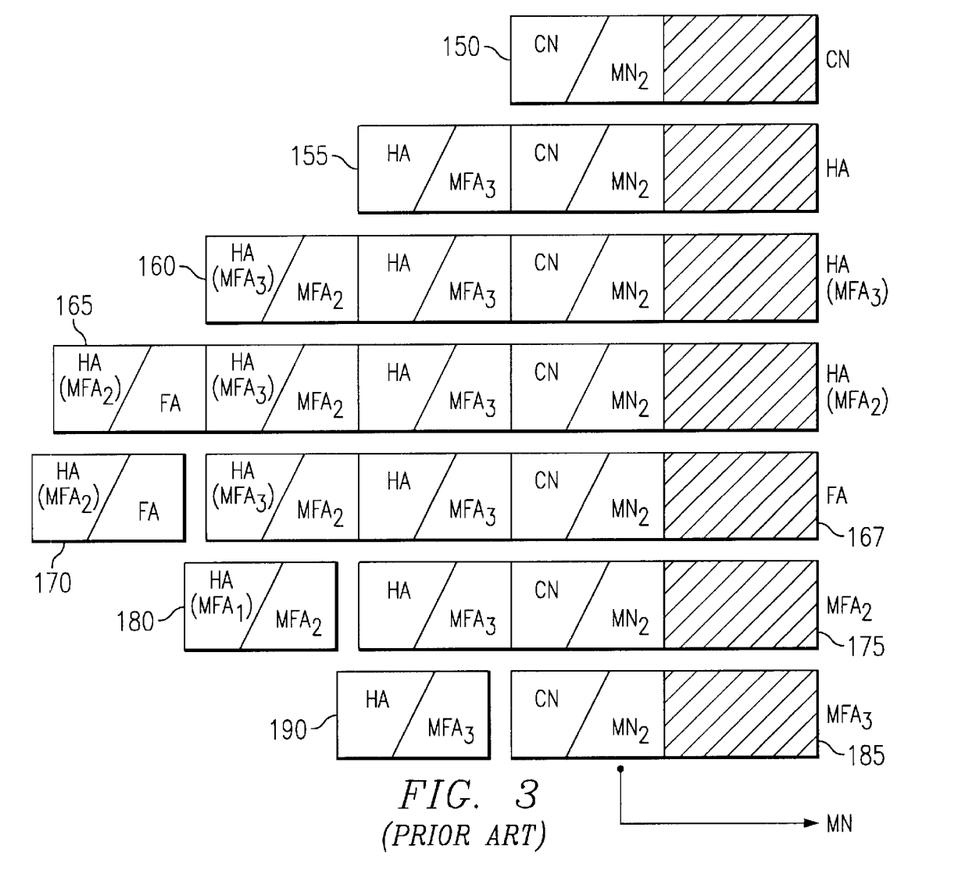
FIG. 3 is a representation of a prior art encapsulation technique for tunneling an information packet to a Mobile Node through two mobile foreign agents.

In FIG. 1, the Home Agent 22 would encapsulate the information packet 150 by adding header information based on the care-of address for Mobile Node (MN$_2$) 80, which includes the IP address of the Mobile Foreign Agent MFA$_3$ on home network 82. The encapsulated information packet is shown in FIG. 3 as information packet 155 with the IP address HA 22 placed in the source field and the IP address of MFA$_3$ 82 placed in the destination field of the IP header. This IP address for MFA$_3$ would be the address for Home Agent on the MFA$_3$ home network.

The information packet 155 is directed to Home Agent (MFA$_3$) 39 in MFA$_3$ home network 38 along communication link 36, whereupon the Home Agent (MFA$_3$) 39 will encapsulate the information packet again using the care-of address for MFA$_3$ 82. This encapsulated information packet is represented by information packet 160 (shown in FIG. 3) where the address of the HA(MFA$_3$) 39 is placed in the source field and the address of the Mobile Foreign Agent (MFA$_2$) is placed in the destination field of the IP header. This IP address for MFA$_2$ would be the address for Home Agent on the MFA$_2$ home network.

The Home Agent (MFA$_3$) 39 would direct the encapsulated information packet to Home Agent (MFA$_2$) 50 in MFA$_2$ home network 45 along communication link 47, whereupon the Home Agent (MFA$_2$) 50 will encapsulate the information packet using the care-of address for Mobile Foreign Agent (MFA$_2$). The encapsulated information packet is shown in FIG. 3 where information packet 165 includes an address of HA(MFA$_2$) 50 in the source field and the address of Foreign Agent 60 in the destination field of the IP header. After encapsulation, the information packet 165 would then be directed to the Foreign Agent 60 along communication link 48.

Upon receipt of the information packet 165, the Foreign Agent 60 will decapsulate the information packet 165 by removing the outer IP header 170 that contains the IP addresses of the HA(MFA$_2$) 50 and Foreign Agent 60 in the source and destination fields, respectively. The decapsulation process can be seen in FIG. 3 where the decapsulated source/destination header 170 has been removed from the remainder of the information packet 167. The Foreign Agent 60 determines that the Mobile Foreign Agent (MFA$_2$) 67 is the next routing point for the information packet 167 based on the IP address of the Mobile Foreign Agent (MFA$_2$) 67 placed in the destination field of information packet 167. As shown in FIG. 1, the Foreign Agent 60 directs the information packet 167 to the current location of Mobile Foreign Agent (MFA$_2$) 67 along communication link 64.

The Mobile Foreign Agent (MFA$_2$) 67 accepts the information packet 167 and decapsulates the outer IP header 180 (that contains the IP address of the MFA$_2$ 67 address in the destination field) from the remainder of the information packet. The decapsulated source/destination header information 180 is shown in FIG. 3 with the remainder of the information packet 175. The Mobile Foreign Agent (MFA$_2$) 67 determines that that the Mobile Foreign Agent (MFA$_3$) 82 is the next routing point for the information packet 175 based on the IP address of the Mobile Foreign Agent (MFA$_3$) 82 found in the destination field of information packet 175.

As shown in FIG. 1, the Mobile Foreign Agent (MFA$_2$) 67 directs the information packet 175 to the current location of the Mobile Foreign Agent (MFA$_3$) 82 along communication link 87.

The Mobile Foreign Agent (MFA$_3$) 82 accepts the information packet 175 and decapsulates the outer IP header 190 (containing the IP address of the MFA$_3$ 82 in the destination field) from the remainder of the information packet. The decapsulated source/destination header information 190 is shown in FIG. 3 with the remainder of the information packet 185. The Mobile Foreign Agent (MFA$_3$) 82 determines that Mobile Node (MN$_2$) is the proper destination for information packet 185 based on the IP address of the MN$_2$ 80 found in the destination field of information packet 185. The Mobile Foreign Agent (MFA$_3$) 82 directs the information packet 185 to the Mobile Node (MN$_2$) 80 based along communication link 85. The information packet 185 is then processed by Mobile Node (MN$_2$) 80 to extract the base data (payload) therefrom.

The amount of header information becomes quite extended once multiple mobile foreign networks are placed on the network. As such, the present invention eliminates this extended overhead by reducing the levels of encapsulation. The present invention can be seen in FIG. 4 where the multiple levels of encapsulation at each tunneling action are replaced by a single level of encapsulation that is modified with each encapsulation action.

The first reduced overhead tunneling method in the present invention is decapsulation/encapsulation. After the initial encapsulation by the home agent, all subsequent agents will decapsulate the outer-most source/destination fields from the information packet prior to encapsulating the information packet with new source/destination fields.

Figures 4, 5, 6, 7:
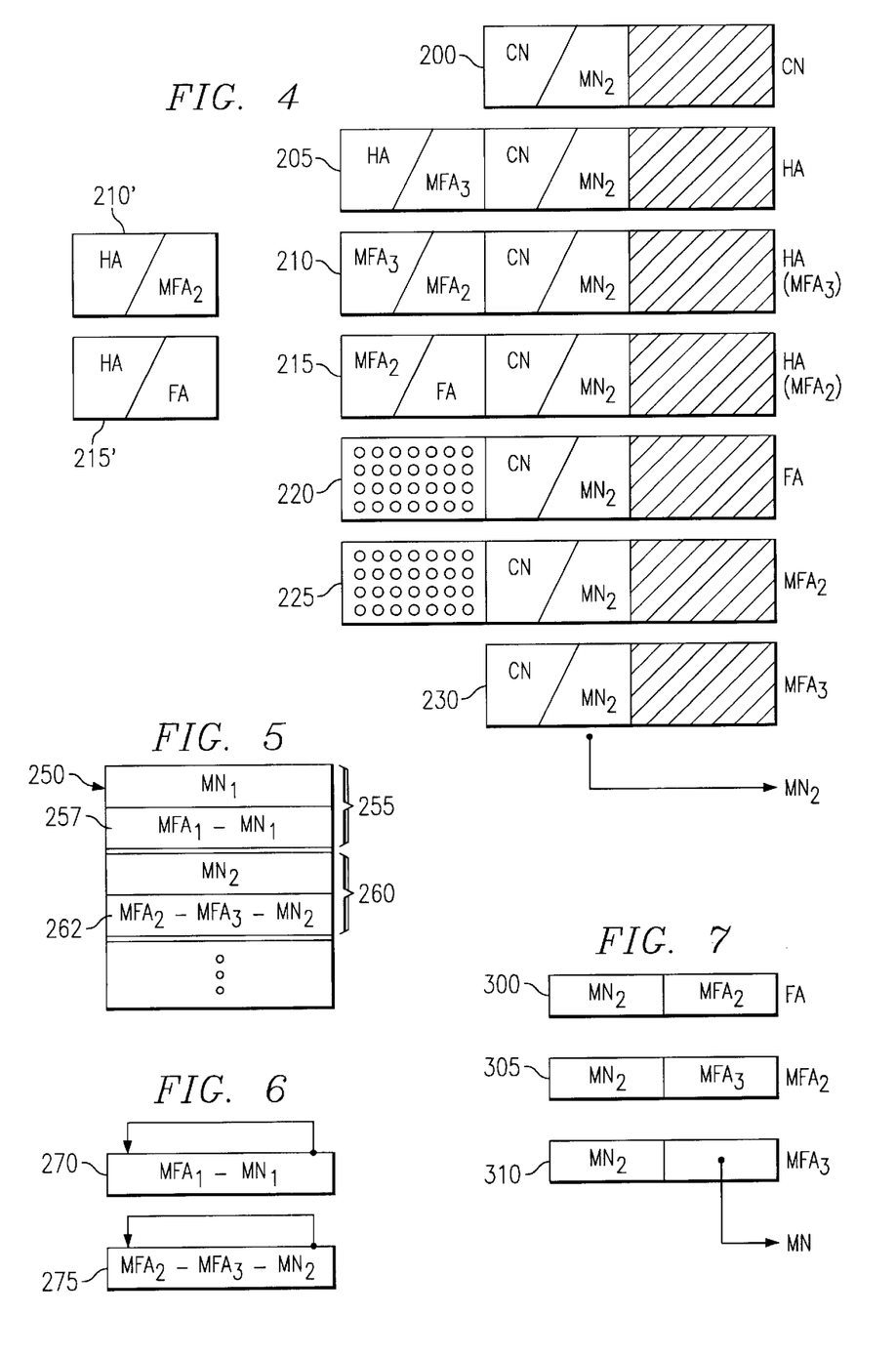

For example, in FIG. 4, the Correspondent Node (CN) 10 will send the Mobile Node (MN$_2$) the information packet 200. By normal IP routing procedures, the information packet 200 will be received by Home Agent 22. The Home Agent 22 will encapsulate the information packet with an outer IP header that will contain the IP address of HA 22 in the source field and the IP address of the Mobile Foreign Agent (MFA$_3$) 82 in the destination field. This IP address for MFA$_3$ 82 would be the address for Home Agent on the MFA$_3$ home network. The resulting information packet 205 is sent from Home Agent 22 to the Home Agent (MFA$_3$) 39 in MFA home network 38. The Home Agent (MFA$_3$) 39 will decapsulate the source/destination header information from the information packet 205, and will replace the outer-most source/destination header information with new source/destination header information. This outer header is shown in the information packet 210 of FIG. 4 that includes the IP address of the MFA$_3$ 82 in the source field and the IP address of MFA$_2$ 67 in the destination field (based upon care-of addressing for MFA$_3$). This IP address for MFA$_2$ 67 would be the address for Home Agent on the MFA$_2$ home network.

The information packet 210 is sent from Home Agent (MFA$_3$) 39 to Home Agent (MFA$_2$) 50 along communication link 47. The Home Agent (MFA$_2$) 50 will decapsulate the source/destination header information from the information packet 210, and will replace the outer-most source/destination header information. The replaced outer header is shown in the information packet 215 of FIG. 4 that includes the IP address of the MFA$_2$ 67 in the source field and the IP address of the FA 60 in the destination field. (based upon care-of addressing for MFA$_2$). Accordingly, the overall quantity of source/destination header information will never exceed a single level of encapsulation above the original information packet because the source/destination header information will be decapsulated and encapsulated at the agents in the tunneling operation.

The second reduced overhead tunneling method in the present invention is called forwarding. After the initial encapsulation by the home agent, all subsequent agents will replace the destination address in the outer-most source/destination header of the information packet with the next destination address. The source information will remain the same, but the destination address will change with each tunneling action.

For example, in FIG. 4, the Correspondent Node (CN) 10 will send the Mobile Node ($MN_2$) the information packet 200. By normal IP routing procedures, the information packet 200 will be received by the Home Agent 22. The Home Agent 22 will encapsulate the information packet with an outer IP header that will contain the IP address of HA 22 in the source field and the IP address of the Mobile Foreign Agent ($MFA_3$) 82 in the destination field. The Home Agent 22 sends the resulting information packet 205 to the Home Agent ($MFA_3$) 39 in MFA home network 38 using communication link 36. The Home Agent ($MFA_3$) 39 will replace the destination field in the IP header of the information packet 205 (identifying $MFA_3$) with the IP address of the $MFA_2$ 67 (based upon care-of addressing for $MFA_3$). This modified header 210' is shown in FIG. 4 and would be located at the outer-most header of information packet 210.

The information packet 210 with outer header 210' is sent from Home Agent ($MFA_3$) to Home Agent ($MFA_2$) 50 along communication link 47. The Home Agent ($MFA_2$) 50 will replace the destination field in the IP header of the information packet 210 (identifying $MFA_2$) with the IP address of the Foreign Agent 60 (based upon care-of addressing for $MFA_2$). This modified header 215' is shown in FIG. 4 and would be located at the outer-most header of information packet 215. Accordingly, the overall quantity of source/destination header information will never exceed a single level of encapsulation over the original information packet because the information packet will always have the destination addresses in the source/destination header replaced as opposed to adding an additional encapsulation level with each tunneling operation.

While the present invention reduces overhead during the transmission of encapsulated information packets, the static (or fixed) foreign network will only receive an information packet with the Mobile Node address identifying the destination address. For instance, Foreign Agent 60 will receive an information packet 215 (with outer header 215 or 215') having a source/destination header information identifying the Foreign Agent 60. Foreign Agent 60 will need to possess sufficient information relating to the topography of the nodes on its network to direct the information packet to the appropriate mobile foreign network or Mobile Node. It should be noted that anytime the IP header is changed, the router needs to run a checksum on the IP header to avoid creating a possible error detection event. This is additional overhead which should be conducted in the present invention.

Two methods for directing the information packet to the appropriate Mobile Node location based upon the single level of encapsulation include "source routing" and "next hop routing." Both methods require that the foreign networks and mobile foreign agents keep track of topological information on the location of Mobile Nodes and the relationship of Mobile Nodes with mobile foreign networks. This additional topological information will reside on physical computer systems to be operated upon as the information packets are processed. As such, this topological information does not occupy usable bandwidth in the mobile communication system like the additional source/destination header information associated with the multiple levels of encapsulation. Accordingly, the additional topological information will increase the processing and data retention requirements on the foreign network and the mobile foreign network, but this increased overhead will still be less than the overhead occupied by the source/destination header information used in the prior art multiple levels of encapsulation.

According to the source routing method of directing information packets through the foreign networks and mobile foreign networks, the Foreign Agent 60 will maintain current routing chain information for each Mobile Node attached directly or indirectly to the foreign network 55. The Foreign Agent 60 will maintain a data structure in a linked list format for the routing chain information to each Mobile Node attached to the foreign network 55—directly or indirectly to the Foreign Agent 60 through a mobile foreign network(s).

In FIG. 5, a visiting list 250 to be generated and maintained by Foreign Agent 60 is shown for the Mobile Nodes $MN_1$ and $MN_2$. This visiting list 250 is a linked list data structure that identifies the intermediate nodes and agents between Foreign Agent 60 and the Mobile Nodes. For $MN_1$, the linked list 257 is shown in the data structure 255, and for $MN_2$, the linked list 262 is shown in the data structure 260.

When the information packet 220 in FIG. 4 is processed by the Foreign Agent 60, the source/destination header information is replaced with the linked list for the particular destination Mobile Node. If the destination Mobile Node is $MN_1$, then the outer source/destination header will be replaced with the linked list 270 shown in FIG. 6. If the destination Mobile Node is $MN_2$, the outer source/destination header will be replaced with linked 275 shown in FIG. 6. The replaced outer header is shown in the shaded areas on information packets 220 and 225 in FIG. 4.

The linked list will designate the next destination for the information packet by the pointer designation in the linked list. Initially the pointer will designate the next intermediate network for the information packet as shown in the linked lists of FIG. 6. For linked list 270, the pointer will designate $MFA_1$ 69 and for linked list 275, the pointer will designate $MFA_2$ 67. After the information packet is received by the intermediate nodes, the linked list pointer value is incremented, and the linked list pointer should indicate the next node for the information packet transfer.

For example, after the information packet is transmitted to $MFA_2$ 67, the linked list pointer will be incremented to point to the next Mobile Foreign Agent in the path to Mobile Node $MN_2$ 67—that is Mobile Foreign Agent $MFA_3$ 82. After the linked list has been incremented by all the intermediate nodes, the pointer should indicate that the Mobile Node is the next appropriate destination for the information packet. Accordingly, after the information packet is process by $MFA_1$ or $MFA_3$, the pointer should indicate the next destination is the Mobile Node, $MN_1$ or $MN_2$, respectively. If the next destination identified by the pointer does not identify an existing intermediate node attached to the present agent, an error condition will be initiated and appropriate error messages will be generated.

The second method for directing information packets in the foreign network is called "next hop routing." In next hop routing, each node on the network will maintain a next hop routing table for each Mobile Node attached to it, directly or indirectly, on the foreign network. The next hop routing tables 300, 305 and 310 for Mobile Node $MN_2$ is shown in FIG. 7 for the Foreign Agent 60, the Mobile Foreign Agent (MFA2) 67, and Mobile Foreign Agent (MFA3) 82, respectively. Each intermediate node on the foreign network will maintain this additional data structure for all Mobile Nodes attached, directly or indirectly, to the intermediate node.

As the information packet is processed by the Foreign Agent 60, the next hop routing table is consulted to determine the next destination for the information packet. In FIG. 7, the next hop for an information packet directed to Mobile Node ($MN_2$) from the Foreign Agent 60 will be Mobile Foreign Agent ($MFA_2$) as shown on next hop routing table 300. The information packet will be directed to Mobile Foreign Agent ($MFA_2$), and that intermediate node will consult its next hop routing table for Mobile Node $MN_2$. The next hop routing table 305 at the Mobile Foreign Agent ($MFA_2$) will indicate the next destination for the information packet to be Mobile Foreign Agent ($MFA_3$). The information packet will be transferred to that Mobile Foreign Agent ($MFA_3$), and that mobile foreign agent will consult its next hop routing table 310 to determine the next destination for the information packet. The next destination for the information packet will be the Mobile Node $MN_2$ as identified in the next hop routing table for Mobile Foreign Agent ($MFA_3$).

As can be seen from the above, the next hop routing method requires more data structure generation and retention at the intermediate nodes on the foreign networks, while the source based routing requires more data structure generation and retention by the Foreign Agent. Depending on the system configuration, the system user may prefer one routing method over the other based on where and how the system can generate and maintain data structures.

As an added benefit to the source based and next hop routing methods, the Foreign Agent can consult with the data structures maintained to support these routing methods before transmitting information packets outside the foreign network. If the information packet is addressed to a Mobile Node already residing on the foreign network, then the Foreign Agent need only route the information packet to that Mobile Node without directing the information packet outside the foreign network. As shown in FIG. 1, such a transmission could occur when Mobile Node $MN_2$ 80 transmits an information packet to Mobile Node $MN_1$ 75. The information packet does not need to be transmitted to the Mobile Node Home Agent 22 in the present invention because the Foreign Agent 60 detects the presence of the Mobile Node $MN_1$ 75 locally on the foreign cellular network based upon information in the data structures maintained for source routing or next hop routing. Foreign Agent 60 directs the information packet to Mobile Node $MN_1$ 75 using these data structures in the routing schemes described above. Accordingly, these are additional efficiencies in routing are created from the use of the data structures supported by source based routing and next hop routing in the present invention.

While the invention has been particularly shown and described with respect to preferred embodiments, it will be readily understood that minor changes in the details of the invention may be made without departing from the spirit of the invention.

Having described the invention, we claim:

1. A method of communicating to a mobile node on a communications system having a home network for the mobile node, at least one foreign network, and at least one mobile foreign agent connected to the mobile node comprising the steps of:

receiving at the mobile node home network an information packet addressed to the mobile node;

encapsulating the information packet with a first header having an address of the mobile foreign agent;

transmitting the encapsulated information packet to the home network of the mobile foreign agent at the address of the mobile foreign agent;

decapsulating the first header of the information packet having the address for the mobile foreign agent;

encapsulating the information packet with a second header having an address for a network coupled to the mobile foreign agent;

transmitting the information packet to the network coupled to the mobile foreign agent as addressed in the second header for subsequent transmission toward the mobile node.

2. The method of claim 1 further comprising the steps of:

receiving the encapsulated information packet at the foreign network;

decapsulating the second header from the information packet;

transmitting the information packet to the mobile foreign agent connected to the mobile node.

3. The method of claim 2 further comprising the steps of:

using routing chain information maintained by the foreign agent in the foreign network to determine the proper transmission route for the information packet from the foreign network to the mobile node.

4. The method of claim 2 further comprising the steps of:

using a routing table maintained by the foreign agent in the foreign network to determine the appropriate next transmission point for the information packet from the foreign network.

5. The method of claim 2 further comprising the steps of:

receiving at the mobile foreign agent the information packet addressed to the mobile node;

transmitting the information packet to the mobile node.

6. The method of claim 1 further comprising the steps of:

receiving the encapsulated information packet at a second home network for a second mobile foreign agent connected to the mobile foreign agent;

decapsulating the second header having an address for the second mobile foreign agent;

encapsulating the information packet with a third header having an address for a network coupled to the second mobile foreign agent;

transmitting the information packet to the network coupled to the mobile foreign agent as addressed in the third header for subsequent transmission toward the mobile node.

7. The method of claim 6 further comprising the steps of:

receiving the encapsulated information packet at the foreign network;

decapsulating the third header from the information packet;

transmitting the information packet to the second mobile foreign agent connected to the mobile mobile foreign agent.

8. The method of claim 7 further comprising the steps of:

using routing chain information to determine the proper transmission route for the information packet from the foreign network to the mobile node.

9. The method of claim 7 further comprising the steps of:

using a routing table to determine the appropriate next transmission point for the information packet from the foreign network.

10. The method of claim 7 further comprising the steps of:

receiving the information packet at the second mobile foreign agent; and, transmitting the information packet to the mobile foreign agent from the second mobile foreign agent.

11. The method of claim 10 further comprising the steps of:

using routing chain information to determine the proper transmission route for the information packet from the foreign network to the mobile node.

12. The method of claim 10 further comprising the steps of:

using a routing table to determine the appropriate next transmission point for the information packet from the foreign network.

13. The method of claim 10 further comprising the steps of:

receiving at the mobile foreign agent the information packet addressed to the mobile node;

transmitting the information packet to the mobile node.

14. A method of communicating to a mobile node on a communications system having a home network, at least one foreign network, and at least one mobile foreign agent connected to the mobile node comprising the steps of:

receiving at the mobile node home network an information packet addressed to the mobile node;

encapsulating the information packet with a header having a first destination address for the mobile foreign agent;

transmitting the encapsulated information packet to the home network for the mobile foreign agent at the address of the mobile foreign agent;

removing the first destination address from the header of the information packet;

inserting a second destination address into the header of the information packet which includes an address of a network coupled to the mobile foreign agent;

transmitting the information packet to the network coupled to the mobile foreign agent as addressed in the second destination address for subsequent transmission toward the mobile node.

15. The method of claim 14 further comprising the steps of:

receiving the encapsulated information packet at the foreign network;

decapsulating the header from the information packet;

transmitting the information packet to the mobile foreign agent connected to the mobile node.

16. The method of claim 15 further comprising the steps of:

using routing chain information maintained by the foreign agent in the foreign network to determine the proper transmission route for the information packet from the foreign network to the mobile node.

17. The method of claim 15 further comprising the steps of:

using a routing table maintained by the foreign agent in the foreign network to determine the appropriate next transmission point for the information packet from the foreign network.

18. The method of claim 15 further comprising the steps of:

receiving at the mobile foreign agent the information packet addressed to the mobile node;

transmitting the information packet to the mobile node.

19. The method of claim 14 further comprising the steps of:

receiving the encapsulated information packet at a second home network for a second mobile foreign agent;

removing the second destination address from the header of the information packet;

inserting a third destination address in the header of the information packet where the third destination address identifies a network coupled to the second mobile foreign agent;

transmitting the information packet to the network coupled to the mobile foreign agent for subsequent transmission toward the mobile node.

20. The method of claim 19 further comprising the steps of:

receiving the encapsulated information packet at the foreign network;

decapsulating the header from the information packet;

transmitting the information packet to the second mobile foreign agent connected to the mobile mobile foreign agent.

21. The method of claim 20 further comprising the steps of:

using routing chain information to determine the proper transmission route for the information packet from the foreign network to the mobile node.

22. The method of claim 20 further comprising the steps of:

using a routing table to determine the appropriate next transmission point for the information packet from the foreign network.

23. The method of claim 20 further comprising the steps of:

receiving the information packet at the second mobile foreign agent; and, transmitting the information packet to the mobile foreign agent from the second mobile foreign agent.

24. The method of claim 23 further comprising the steps of:

using routing chain information to determine the proper transmission route for the information packet from the foreign network to the mobile node.

25. The method of claim 23 further comprising the steps of:

using a routing table to determine the appropriate next transmission point for the information packet from the foreign network.

26. The method of claim 23 further comprising the steps of:

receiving at the mobile foreign agent the information packet addressed to the mobile node;

transmitting the information packet to the mobile node.

27. A system for communicating to a mobile node in a wireless communications network comprising:

a home network for a mobile node having a home agent coupled to a router capable of directing information packets to and from the home network, said home agent will encapsulate information packets addressed to the mobile node with a first header having a first address;

an mobile foreign agent network located at the first address having an mobile foreign agent home agent coupled to a router capable of directing information packets to and from the mobile foreign agent home network, said mobile foreign agent home agent will decapsulate the first header from the information packet and encapsulate the information packet with a second header having a second address;

a foreign network located at a second address having a foreign agent coupled to a router capable of directing communications to and from the foreign network and a transmitter capable of performing wireless communications with at least one mobile foreign agent located in the transmission range of the transmitter for the foreign network, said foreign agent will direct the information packet to the mobile foreign agent;

a receiver and transmitter coupled to the mobile foreign agent for receiving information packet transmissions from the foreign agent and transmitting the information packets to the mobile node; and a receiver at the mobile node for receiving the information packets addressed to the mobile node.

28. The system of claim 27 further comprising:

multiple mobile foreign agents within transmission range of the foreign network transmitter.

29. The system of claim 27 further comprising:

a second mobile node coupled by wireless connection to the mobile foreign agent.

30. The system of claim 27 further comprising:

a second mobile foreign agent coupled by wireless connection to the mobile foreign agent.

31. The system of claim 30 further comprising:

a second mobile node coupled by wireless connection to the second mobile foreign agent.

32. The system of claim 27 further comprising:

a routing chain information table at the foreign agent that assists with determining the proper transmission route for the information packet from the foreign network to the mobile node.

33. The method of claim 27 further comprising:

a routing table at the foreign agent and the mobile foreign agent that assists with determining the next appropriate transmission point for the information packet from the foreign network to the mobile node.

34. A system for communicating to a mobile node in a wireless communications network comprising:

a home network for a mobile node having a home agent coupled to a router capable of directing information packets to and from the home network, said home agent will encapsulate information packets addressed to the mobile node with a first header having a first destination address;

an mobile foreign agent home network located at the first destination address having an mobile foreign agent home agent coupled to a router capable of directing information packets to and the mobile foreign agent home network, said mobile foreign agent home agent will remove the first destination address from the information packet header and insert a second destination address in the information packet header;

a foreign network located at a second destination address having a foreign agent coupled to a router capable of directing communications to and from the foreign network and a transmitter capable of performing wireless communications with at least one mobile foreign agent located in the transmission range of the transmitter for the foreign network, said foreign agent will direct the information packet to the mobile foreign agent; and, a receiver and transmitter coupled to the mobile foreign agent for receiving information packet transmissions from the foreign agent and transmitting the information packets to the mobile node;

a receiver at the mobile node for receiving the information packets addressed to the mobile node.

35. The system of claim 34 further comprising:

multiple mobile foreign agents within transmission range of the foreign network transmitter.

36. The system of claim 34 further comprising:

a second mobile node coupled by wireless connection to the mobile foreign agent.

37. The system of claim 34 further comprising:

a second mobile foreign agent coupled by wireless connection to the mobile foreign agent.

38. The system of claim 37 further comprising:

a second mobile node coupled by wireless connection to the second mobile foreign agent.

39. The system of claim 34 further comprising:

a routing chain information table at the foreign agent that assists with determining the proper transmission route for the information packet from the foreign network to the mobile node.

40. The method of claim 34 further comprising:

a routing table at the foreign agent and the mobile foreign agent that assists with determining the next appropriate transmission point for the information packet from the foreign network to the mobile node.

* * * * *